(12) United States Patent
Bianchi et al.

(10) Patent No.: US 10,708,179 B2
(45) Date of Patent: Jul. 7, 2020

(54) METHOD OF HANDLING DATA PACKETS THROUGH A CONDITIONAL STATE TRANSITION TABLE AND APPARATUS USING THE SAME

(71) Applicant: CONSORZIO NAZIONALE INTERUNIVERSITARIO PER LE TELECOMUNICAZIONI (CNIT), Parma (PR) (IT)

(72) Inventors: Giuseppe Bianchi, Parma (IT); Salvatore Pontarelli, Parma (IT); Marco Bonola, Parma (IT); Carmelo Cascone, Parma (IT); Davide Sanvito, Parma (IT); Antonio Capone, Parma (IT)

(73) Assignee: CONSORZIO NAZIONALE INTERUNIVERSITARIO PER LE TELECOMUNICAZIONI (CNIT), Parma (PR) (IT)

(*) Notice: Subject to any disclaimer, the term of this patent is extended or adjusted under 35 U.S.C. 154(b) by 0 days.

(21) Appl. No.: 16/091,258

(22) PCT Filed: Mar. 27, 2017

(86) PCT No.: PCT/IB2017/051738
§ 371 (c)(1),
(2) Date: Oct. 4, 2018

(87) PCT Pub. No.: WO2017/175090
PCT Pub. Date: Oct. 12, 2017

(65) Prior Publication Data
US 2019/0158388 A1 May 23, 2019

(30) Foreign Application Priority Data
Apr. 5, 2016 (IT) .................. 102016000034641

(51) Int. Cl.
*G06F 15/173* (2006.01)
*H04L 12/721* (2013.01)
(Continued)

(52) U.S. Cl.
CPC .............. *H04L 45/38* (2013.01); *H04L 45/54* (2013.01); *H04L 45/56* (2013.01); *H04L 45/64* (2013.01)

(58) Field of Classification Search
CPC .......... H04L 45/38; H04L 45/54; H04L 45/64
(Continued)

(56) References Cited

U.S. PATENT DOCUMENTS 10,110,489 B2 * 10/2018 Bianchi .................. H04L 45/56
2013/0219078 A1 * 8/2013 Padmanabhan ....... H04L 41/042
709/238
2017/0317930 A1 * 11/2017 Bianchi .................. H04L 45/56

FOREIGN PATENT DOCUMENTS

WO  WO2015131929 A1   9/2015
WO  WO2015136432 A1   9/2015
WO  WO-2017140363 A1 * 8/2017 ............. H04L 45/54

OTHER PUBLICATIONS

Giuseppe Bianchi et al: "OpenState", Computer Communication Review, ACM, New York, NY, US, vol. 44, No. 2., Apr. 8, 2014.

* cited by examiner

*Primary Examiner* — Hee Soo Kim
(74) *Attorney, Agent, or Firm* — King & Schickli, PLLC (57) ABSTRACT

The apparatus (SW) has a plurality of input/output ports (P1, P2, P3, P4, P5) for receiving and transmitting data packets, and comprises a data packets handling circuitry (DPL) arranged to forward data packets between the input/output ports (P1, P2, P3, P4, P5) and an internal apparatus controller (CPL) arranged to control the data packet handling circuitry (DPL); the apparatus controller (CPL) is arranged (Continued)

to store (MEM) at least one state transition table (TT) to be used for controlling the forwarding of data packets by the data packets handling circuitry (DPL); the apparatus controller (CPL) is arranged to use the state transition table (TT) for implementing at least one finite state machine (FSM); the apparatus controller (CPL) is arranged to use the state transition table (TT) for handling separately distinct incoming data packets flows through corresponding distinct instances of finite state machine; the state transition table (TT) corresponds to the combination of a state table (ST), a condition table (CT) and a flow table (FT); the apparatus controller (CPL) is arranged to store (MEM) the state table (ST), the condition table (CT) and the flow table (FT); the apparatus controller (CPL) comprises a condition logic (CL) for calculating conditions stored in the condition table (CT) based on data from the state table (ST) in order to query the flow table (FT).

19 Claims, 4 Drawing Sheets

(51) Int. Cl.
  *H04L 12/771* (2013.01)
  *H04L 12/715* (2013.01)
  *H04L 12/741* (2013.01)
(58) Field of Classification Search
  USPC .......................................................... 709/238
  See application file for complete search history.

METHOD OF HANDLING DATA PACKETS THROUGH A CONDITIONAL STATE TRANSITION TABLE AND APPARATUS USING THE SAME

FIELD OF THE INVENTION

The present invention relates to a method of handling data packets (for example IP packets, Ethernet packets, Ethernet frames, . . . ) and to an apparatus using the same.

In particular, the present invention is advantageously applied in those network switching apparatuses generally called "switches" and concentrates on how to forward data packets between their input/output ports. Nowadays, the word "switch" may refer to an apparatus operating at Layer 2 or Layer 3 or Layer 4 of the OSI model; in the past, the word "switch" was limited to an apparatus operating at Layer 2 and the word "router" was limited to an apparatus operating at Layer 3.

BACKGROUND OF THE INVENTION

Just a few years ago, it was normal to configure network apparatuses using proprietary interfaces, differing across vendors, apparatus types (switches, routers, firewalls, load balancers, etc.), and even different firmware releases for a same apparatus. Managing heterogeneous multivendor networks of non-marginal scale was (and still is) extremely difficult, and required (and still requires) a huge expertise.

"OpenFlow" emerged quite recently, i.e. in 2008, as an attempt to change this situation. OpenFlow's breakthrough was the identification of a vendor-agnostic programming abstraction for configuring the forwarding behavior of network switching apparatus. Via the OpenFlow Application Programming Interface, in short "API", network administrators can remotely reconfigure at runtime forwarding tables, probe for flow statistics, and redirect packets not matching any local flow entry towards a network controller for further analysis/processing and for taking relevant decisions; in essence "program" the network from a central control point, clearly separated from the forwarding level.

Today, such vision is called Software Defined Networking, in short "SDN".

OpenFlow turned to be immediately deployable, thanks to its pragmatic balance between open network programmability and real world vendors' and deployers' needs. Starting from the recognition that several different network devices implement somewhat similar flow tables for a broad range of networking functionalities (L2/L3 forwarding, firewall, NAT, etc.), the authors of OpenFlow proposed an abstract model of a programmable flow table which was amenable to high-performance and low-cost implementations; capable of supporting a broad range of research; and consistent with vendors' need for closed platforms.

Via the OpenFlow "match/action" abstraction, the device programmer can broadly specify a flow via an header matching rule, associate forwarding/processing actions to the matching packets, and access bytes/packet statistics associated to the specified flow.

Some years have now passed since the OpenFlow inception, and the latest OpenFlow standard, now at version 1.5, appears way more complex than the initial elegant and simple concept. To fit the real-world needs, a huge number of extension (not only the initially foreseen functional ones, such as supplementary actions or more flexible header matching, but also structural ones such as action bundles, multiple pipelined tables, synchronized tables, and many more) were promoted in the course of the standardization process. And new extensions are currently under discussion for the next OpenFlow version.

All this hectic work was not accompanied by any substantial rethinking in the original programmatic abstraction (besides the abandoned Google OpenFlow 2.0 proposal, considered too ambitious and futuristic), so as to properly capture the emerging extensions, simplify their handling, and prevent the emergence of brittle, platform-specific, implementations which may ultimately threaten the original vendor-independency goal of the OpenFlow inventors.

Even if an OpenFlow apparatus may now be rich of functionalities and primitives, it remains completely "dumb", with all the "smartness" placed at the central network controller side.

From the article "Simpler Network Configuration with State-based Network Policies" by H. Kim et al. of the Georgia Institute of Technology, College of Computing SCS technical report, there is know a solution based on Open-Flow; according to this solution, the network forwarding apparatuses (see switches in FIG. 1) are traditional Open-Flow switches, i.e. "dumb", and all the "smartness" is placed inside a central network controller called "PyResonance controller" (see upper part of FIG. 1 and corresponding explanation in paragraph 2.1). The network forwarding apparatuses (that may be called simply "apparatuses") according to this solution comprises, as always, an internal data packets handling circuitry and an internal apparatus controller. The "smartness" is implemented inside the central network controller using a programming abstraction based on traditional Finite State Machines, in short "FSM".

Recently and despite OpenFlow's data plane programmability, the need to use advanced packet handling for important network services has lead to the proliferation of many types of specialized "middle-boxes". The extension of programmability and exibility features to these advanced network functions is a crucial aspect, and a recent trend is that of virtualizing them in data centers on general purpose hardware platforms and to make them programmable and configurable using SDN approaches.

The present Inventors wanted to follow the OpenFlow approach (avoiding "middle-boxes" and "virtualization"), i.e. network management control should be (logically) centralized; in other words, they wanted to keep the control plane and the data plane separate according to the spirit of SDN.

However, the present Inventors posit that several statefull tasks, just involving local states inside single links/switches are unnecessarily centralized according to OpenFlow and not deployed to the local apparatuses. As a result, the explicit involvement of the controller for any statefull processing and for any update of the match/action rules, is problematic. In the best case, this leads to extra signaling load and processing delay, and calls for a capillary distributed implementation of the "logically" centralized controller. In the worst case, the very slow control plane operation a priori prevents the support of network control algorithms which require prompt, real time, reconfiguration in the data plane forwarding behavior.

In essence, dumbness in the data forwarding plane appears to be a by-product of the limited capability of the OpenFlow data plane API—Application Programming Interface, rather than an actual design choice or an SDN postulate.

Therefore, the present Inventors thought of a better data plane API—Application Programming Interface which would permit to program some level of smartness directly inside the forwarding apparatuses.

The present Inventors thought that a major shortcoming of OpenFlow is its inability to permit the programmer to deploy states inside the forwarding apparatus.

However, adding states to OpenFlow was considered not sufficient: the programmer should be entitled to formally specify how states should be handled, and this specification should be executed inside the apparatus with no further interaction with the controller.

Furthermore, they considered that an effective solution should have come along with two attributes: (1) be amenable to high speed implementation, (2) not violate the vendor-agnostic principle which has driven the OpenFlow invention, and which has fostered SDN; in essence, an effective solution should be a concrete and pragmatic "abstraction", rather than a theoretical approach.

The present inventors proposed a viable abstraction to formally describe a desired statefull processing of flows inside the network forwarding apparatus, without requiring the apparatus to be open source or to expose its internal design. Such abstraction relies on Finite State Machines, in short "FSM", in particular eXtended Finite State Machines, in short "XFSM".

Extending the OpenFlow abstraction through the use of FSM, in particular XFSM, allows to offload on high performance switches a pretty large set of functions reducing the need to rely on controllers and middle-boxes.

According to the present invention, inclusion of flow states is not limited to the functionality of the apparatus, i.e. its packets handling capabilities, but it takes into account the API—Application Programming Interface.

Advantageously, extending the OpenFlow abstraction through the use of FSM is not disruptive, i.e. it is in line with traditional OpenFlow, and therefore it would be relatively easy to be introduced into existing networks and used by current network operators.

The present Inventors are aware that XFSMs have already been proposed in the field of network apparatuses; anyway, this was done for a completely different application, i.e. in order to convey a desired medium access control operation into a wireless interface card; therefore, the old application and the new application are not related and comparable.

A solution quite similar to the solution of the present invention is known from international patent application published as WO 2015/136432 A1 (from the same inventors) which is incorporated herein by reference. Such solution is based on a state table and a flow table both located inside the network forwarding apparatus; the state table stores data relating to the current state of all data packet flows, and the flow table stores data relating to information for updating the content of the state table and information for causing actions on the received data packets.

SUMMARY OF THE INVENTION

The present Inventors thought of increasing the flexibility of their own previous solution.

The present invention is defined by the appended claims.

A first aspect of the present invention is a (network forwarding) apparatus.

A second aspect of the present invention is a method of handling data packets.

A first important difference with respect to the previous solution is the use of conditions for determining action information and update information from the flow table of the apparatus. For example, while according to WO 2015/136432 A1 the next state of a flow depends only on the current state and a just-occurred event relating to the same flow, according to the present invention the next state depends also on a set of calculated conditions.

A second important difference with respect to the previous solution is that the state table of the apparatus contains flow variables. For each flow, the state table stores not only the current state of the flow but also, for example, the number of received packets belonging to the flow and the time elapsed from the last received packets belonging to the flow. It is to be noted that any of the conditions may be calculated from one or more flow variables.

A third important difference with respect to the previous solution is the use of global variables for determining action information and update information from the flow table of the apparatus; global variables are, for example: the number of packets received by the switch and the operating status of each port of the switch. It is to be noted that any of the conditions may be calculated from one or more global variables.

A fourth important difference with respect to the previous solution is that the flow table stores data relating also to information for updating flow variables and/or global variables.

A fifth important difference with respect to the previous solution is that flow variables are updated through instructions executed by an arithmetic logic system of the apparatus.

A sixth important difference with respect to the previous solution is that global variables are updated through instructions executed by an arithmetic logic system of the apparatus.

BRIEF DESCRIPTION OF THE DRAWINGS

The present invention will be described in the following with the aid of annexed drawings wherein.

Such description and such drawings are not to be considered as limiting the present invention that is only defined by the annexed claims; in fact, it will clear to one skilled in the art that the embodiments described in the following may be subject to modifications and variants in their details and that alternative embodiments are possible.

Such description considers document WO 2015/136432 A1 as fully known.

In the following the expression "incoming data packets flow" will be often abbreviated as "flow"; it is to be clarified that "flow" does not mean all the incoming data packets received at a port of an apparatus, but means all the incoming data packets (received by an apparatus) whose packet headers match a certain rule.

DETAILED DESCRIPTION OF THE INVENTION

Figure 1:
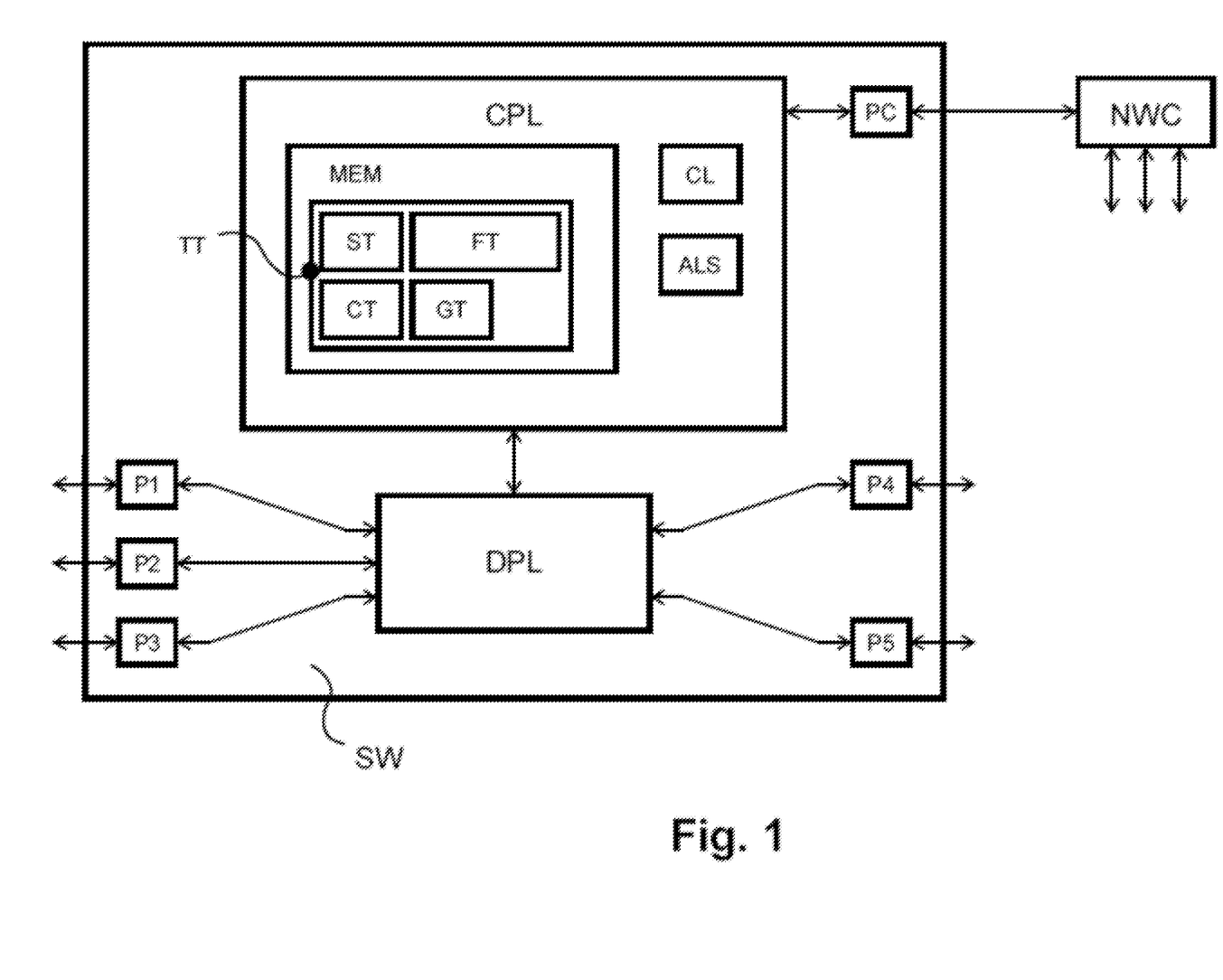
FIG. 1 shows a simplified block diagram of an embodiment of an apparatus according to the present invention.

The network forwarding apparatus SW of the embodiment of FIG. 1, that may be called a "switch", has five input/output ports P1, P2, P3, P4, P5 for receiving and transmitting IP packets, and comprises two basic building blocks: an IP packets handling circuitry DPL, a so-called "data plane", and an internal apparatus controller CPL, a so-called "control plane"; circuitry DPL is arranged to forward IP packets between the input/output ports P1, P2, P3, P4, P5; the internal controller CPL is arranged to control circuitry DPL. Apparatus SW has also a control port PC for communication between the internal apparatus controller CPL and an external network controller NWC; external controller NWC is arranged to control not only apparatus SW, but also many other similar network apparatuses.

Controller CPL comprises a memory MEM, a condition logic CL and an arithmetic logic system ALS; the memory MEM is designed to store at least one state transition table TT to be used by the controller CPL for controlling the forwarding of IP packets by circuitry DPL; controller CPL is arranged to use the state transition table TT for implementing at least one finite state machine FSM and for handling separately distinct incoming IP packets flows through corresponding distinct instances of finite state machine; the apparatus controller CPL may be arranged to handle distinct incoming data packets flows independently or dependently from each other through relations between instances of finite state machine. From the theoretical point of view, the transition table TT might be considered part of the "data plane"; in this case, the controller CPL would manage the transition table TT as an external component.

Therefore, as known, the flows of incoming data packets are handled through finite state machines that are implemented by the internal controller of the apparatus thanks to a transition table; the transition table stores data for moving from one state to another, i.e. managing the so-called "state transitions" or simply "transitions", and taking corresponding actions on the incoming data packets. Each flow has a current state (that changes in time) and the state of the controller is the combination of all the flow states.

In the embodiment of FIG. 1, state transition table TT corresponds to the combination of a state table ST, a global variable table GT, a condition table CT, and a flow table FT. Apparatus internal controller CPL is arranged to receive transition table TT through the control port PC from the network external controller NWC; in particular, it receives flow table FT and condition table CT with full data content and state table ST and global variable table GT with some initial data content; during operation of apparatus SW, data content is built and partially added and partially replaced to the initial data content of state table ST.

As known, the state table stores data relating at least to the current state of all data packet flows.

As known, the flow table stores data relating at least to information for updating the content of the state table and information for causing actions by the data packet handling circuitry of the apparatus.

Figure 2:
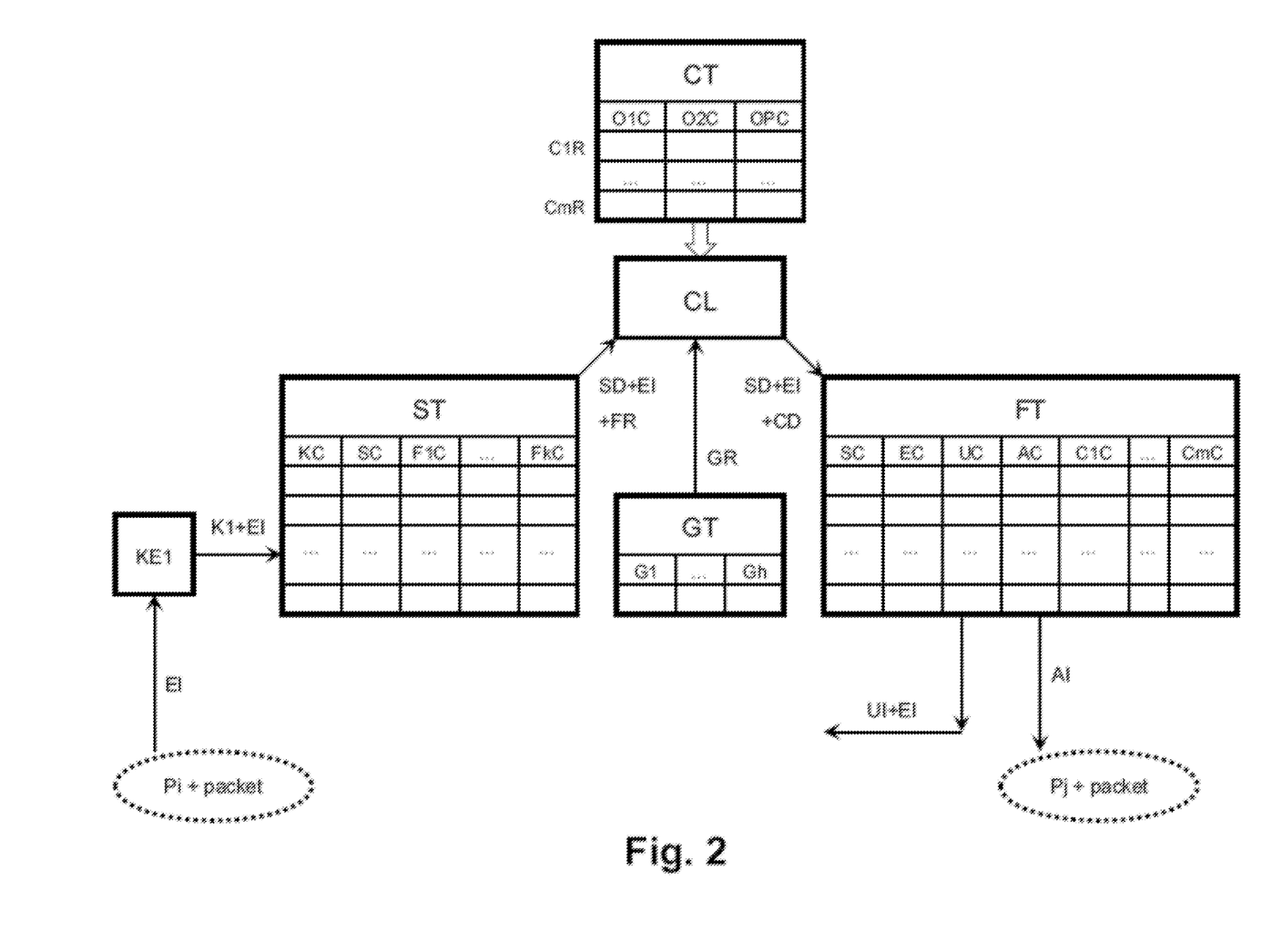
FIG. 2 shows schematically the use of data tables according to an embodiment of the present invention.

FIG. 2 shows in details the state table ST, the global variable table GT, the condition table CT, and the flow table FT.

The state table ST comprises a key column KC, a state column SC and a plurality of flow variable columns F1C-FkC; each of the rows corresponds to a distinct "incoming data packets flow"; a "flow variable" is a variable associated to "incoming data packets flows"; a cell of the flow variable columns stores a value for a specific "incoming data packets flow"; "flow variables" are, for example: the number of received packets belonging to a specific flow, the number of received bytes belonging to a specific flow, the time elapsed from the last received packets belonging to a specific flow, etc.; state and/or variables and/or constants and/or parameters relating to a flow may be considered a "flow context". The global variable table GT comprises, according to this embodiment, a single row of variables associated to all the "incoming data packets flows" (this is the reason why they are called "global"); "global variables" are, for example: the number of packets received by the switch, the number of bytes received by the switch, the operating status of a port of the switch, etc.

The condition table CT comprises a first operand column O1C, a second operand column O2C and an operation column OPC; each of the rows C1R-CmR of the condition table CT rows corresponds to a condition being a conditional operator to be applied to a first operand and a second operand; "global variables" are, for example: a flow variable, a global variable, a field of a packet header, etc.

The flow table FT comprises a state column SC, an event column EC, an action column AC, an update column UC and a plurality of condition check columns C1C-CmC; in particular, the number of condition check columns corresponds to the number of condition table rows; a cell of the condition check columns stores for example a ternary value that means: 1) the corresponding condition in the condition table CT must be checked and must be "true", 2) the corresponding condition in the condition table CT must be checked and must be "false", 3) the corresponding condition in the condition table CT must not be checked.

Figure 3:
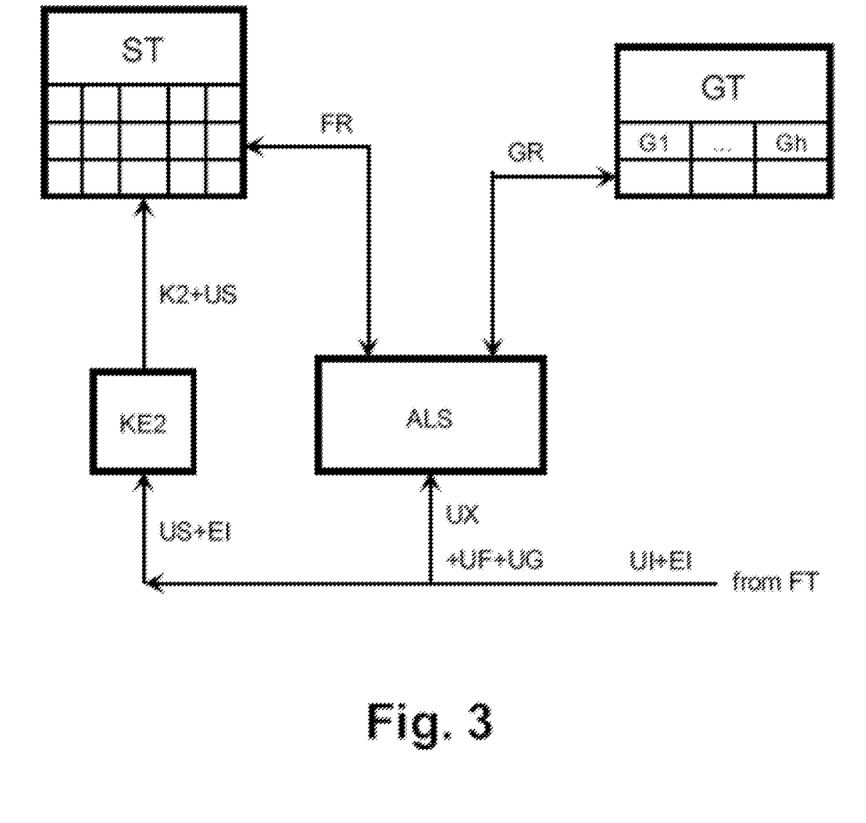
FIG. 3 shows schematically the update of data tables according to an embodiment of the present invention, (FIG. 2 and FIG. 3 correspond to the same embodiment)

FIG. 2 and FIG. 3 show also a first key extraction function KE1 that uses first key information (corresponding to a first key extraction rule) for key extraction, and a second key extraction function KE2 that uses second key information (corresponding to a second key extraction rule) for key extraction.

In general, data relating to the tables ST, GT, CT and FT and the functions KE1 and KE2, if used, may be received from the network external controller NWC during configuration of the apparatus SW.

Event information EI is provided by the data plane DPL to the control plane CPL for each IP packet received by the apparatus SW; typically, event information EI consists in the packet header of the received IP packet and the port number Pi of the i/o port where the IP packet has been received.

Action information AI is provided by the control plane CPL to the data plane DPL for each IP packet received by the apparatus SW; typically, action information AI consists in the packet header of the received IP packet and the port number Pj of the i/o port where the IP packet has to be forwarded and then, typically, transmitted.

The first key extraction function KE1 extracts key data K1 from the packet header.

Key data K1 are used to query the state table ST.

The result of a state table query is state data SD and flow variable data FR.

The condition logic CL is connected to outputs of the state table ST and of the global variable table GT, and calculates all the conditions stored in the condition table CT based (at least) on the flow variable data FR and global variable data GR, that may be for example all the data in the single row of the global variable table GT.

The condition logic CL is connected to inputs of the flow table FT in order to provide condition data CD corresponding to the calculations just carried out.

State data SD, condition data CD and event information EI (the port number Pi, or selected data in the packet header, or port number Pi and selected data in the packet header) are used to query flow table FT. Usually, not the whole event information EI is used for the query, but any combination of switch port number, source MAC address, destination MAC address, source IP address, destination IP address, source TCP port, destination TCP port, and even Wireless LAN ID, IP protocol, Ethernet type. Matching for the purpose of querying the flow table FT is based on the state column SC (in relation to the state data SD), the event column EC (in relation to the event information EI), and the condition check columns C1C-CmC (in relation to the condition data CD).

The state table ST may consist, for example, of a hash table, in particular a d-left hash table; in this way, a state table query may be done in one or few memory accesses and the number of entries to be stored in the state table can be more easily scaled.

The flow table FT may consist, for example, of a content-addressable memory (=CAM), in particular a ternary content-addressable memory (=TCAM); in this way, a flow table query may be done in very simple, effective and efficient way.

The result of a flow table query is update information UI and action information AI. The update information UI may relate to the same instance of finite state machine or to a different instance of finite state machine.

The update information UI consists of: state update information US, flow variable update information UF, global variable update information UG, and update instructions UX. The event information EI and the state update information US are processed by the second key extraction function KE2 (see FIG. 3). The flow variable update information UF, the global variable update information UG, and the update instructions UX are processed by the arithmetic logic system ALS (see FIG. 3).

The second key extraction function KE2 extracts key data K2 from the packet header in the event information EI.

Key data K2 and state update information US are used to update the state table ST; in particular, a row of the state table ST is selected through the key data K2 and the cell of the selected row in the state column SC is updated through the state update information US.

Flow variables and/or global variables are updated by the arithmetic logic system ALS using the flow variable update information UF, the global variable update information UG, and the update instructions UX. The update instructions UX may correspond to one or more instructions. The arithmetic logic system ALS may process one or more instructions contemporaneously; in the latter case the arithmetic logic system ALS may comprise an array of arithmetic logic units for executing a plurality of instructions contemporaneously. An update instruction may consist of an operation field, a source field (for the one or more operands), and a destination field (for the result); the source and the destination may be any of the flow variables F1C-FkC and any of the global variables G1-Gh; the flow variables to be processed are located in the cells of the row in the state column SC selected through the key data K2.

Figure 4:
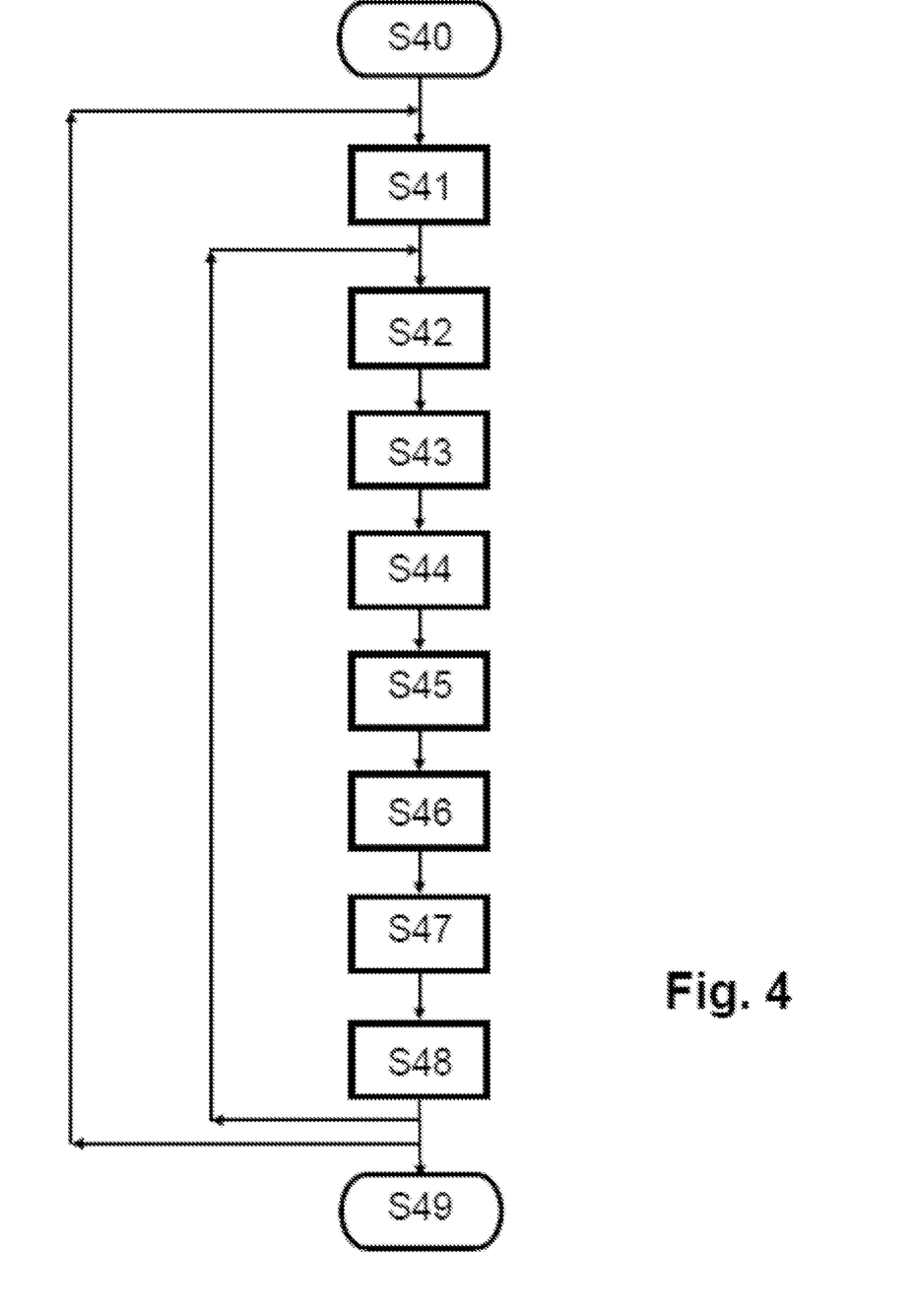
FIG. 4 shows a flow chart of an embodiment of a method according to the present invention.

The processing shown by the flow chart of FIG. 4 refers to the element shown in FIG. 2 and FIG. 3; it has a start S40 and a stop S49, and comprises the following steps:

S41: receiving the flow table FT and the condition table CT (structure and full data) at control port PC from network controller NWC (configuration of apparatus SW), and
receiving the state table ST and the global variable table GT (structure and some data) at control port PC from network controller NWC (configuration from apparatus SW), S42: receiving an IP packet at a first one port Pi of the plurality of input/output ports P1, P2, P3, P4, P5, S43: determining state data SD and flow variable data FR based on data in the IP packets by looking into the state the table ST, S44: calculating condition data CD based on flow variable data FR, global variable data GR and data in the IP packets, S45: determining action information AI and update information UI based on information on an event corresponding to step S42, on the state data SD determined at step S43, and on the condition data CD determined at step S44, by looking into the flow table FT, S46: forwarding the IP packet to no input/output ports or to at least a second one port Pj of the plurality of input/output ports P1, P2, P3, P4, P5 according to the action information AI determined at step S45, S47: updating the state table ST and the global variable table GT according to the update information UI determined at step S45, S48: transmitting the IP packet in accordance to the result of step S36.

The processing shown by the flow chart of FIG. 4 is repeated from step S42 to S48 for any new IP packets received by input/output ports P1, P2, P3, P4, P5 of apparatus SW.

Step S41 may be repeated in case of reconfiguration of apparatus SW by network controller NWC.

It is to be understood that one or more steps of the above described method may be simpler if the apparatus implementing the method is simpler that the one shown in FIG. 1 and FIG. 2 and FIG. 3. For example, an apparatus according to the present invention may not comprise a global variable table GT and/or may not comprise an arithmetic logic system ALS and/or may calculate conditions in a different way.

The invention claimed is:

1. Apparatus having a plurality of input/output ports for receiving and transmitting data packets, and comprising a data packets handling circuitry arranged to forward data packets between the input/output ports and an internal apparatus controller arranged to control said data packet handling circuitry, wherein the apparatus controller is arranged to store at least one state transition table to be used for controlling the forwarding of data packets by the data packets handling circuitry, wherein the apparatus controller is arranged to use said at least one state transition table for implementing at least one finite state machine, wherein the apparatus controller is arranged to use said at least one state transition table for handling separately distinct incoming data packets flows through corresponding distinct instances of finite state machine, wherein said at least one state transition table corresponds to the combination of a state table, a condition table and a flow table, wherein the apparatus controller is arranged to store the state table, the condition table and the flow table, wherein the apparatus controller comprises a condition logic for calculating one or more or all conditions stored in the condition table based on data from the state table in order to query the flow table;

wherein the state table comprises a key column, a state column and a first plurality of flow variable columns, and the apparatus controller is arranged to determine through the state table state data and flow data based on data in incoming data packets, wherein the condition table comprises a first operand column, a second operand column and an operation column, and a second plurality of condition rows, each row of the condition rows corresponding to a condition being a conditional operator to be applied to a first operand and a second operand, wherein the flow table comprises a state column, an event column, an action column, an update column and a third plurality of condition check columns, and the apparatus controller is arranged to determine through the flow table action information and update information based on information on events occurring at the input/output ports, on state data determined through the state table and on condition data determined through the condition table, the action information relating to forwarding actions to be performed on incoming data packets, the update information relating to row updates to be performed on data in the state table, and wherein the condition logic is connected to outputs of the state table and to inputs of the flow table, as well as to the condition table, and is arranged to calculate conditions stored in the condition table based on data from the state table, and to provide condition data in order to query the flow table.

2. Apparatus according to claim 1, wherein said at least one state transition table corresponds to the combination of a state table, a global variable table, a condition table and a flow table, wherein the apparatus controller is arranged to store the state table, the global variable table, the condition table and the flow table,
wherein the condition logic is connected also to outputs of the global variable table, and is arranged to calculate conditions stored in the condition table based also on data from the global variable table.

3. Apparatus according to claim 1, wherein the apparatus has a control port for communication between the internal apparatus controller and an external network controller, wherein the apparatus controller is arranged to receive the state table, the global variable table, the condition table and the flow table through the control port.

4. Apparatus according to claim 1, wherein the apparatus controller is arranged to apply a first key extraction function to data in incoming data packets for the purpose of querying the state table.

5. Apparatus according to claim 1, wherein the apparatus controller is arranged to apply a second key extraction function to data in incoming data packets for the purpose of updating the state table.

6. Apparatus according to claim 5, wherein the update information comprises information for updating the state column in the state table.

7. Apparatus according to claim 6, wherein the update information comprises information for updating at least one of the flow variable columns in the state table.

8. Apparatus according to claim 6, wherein the update information comprises information for updating the global variable table.

9. Apparatus according to claim 7, comprising further an arithmetic logic system, wherein the update information (UI) comprises one or more instructions to be executed by the arithmetic logic system for updating a flow variable in the state table and/or a global variable global in the variable table.

10. Apparatus according to claim 1, wherein said flow table consists of a content-addressable memory, in particular a ternary content-addressable memory.

11. Apparatus according to claim 9, wherein said arithmetic logic system comprises an array of arithmetic logic units for executing a plurality of instructions contemporaneously.

12. Apparatus having a plurality of input/output ports for receiving and transmitting data packets, and comprising a data packets handling circuitry arranged to forward data packets between the input/output ports and an internal apparatus controller arranged to control said data packet handling circuitry, wherein the apparatus controller is arranged to store at least one state transition table to be used for controlling the forwarding of data packets by the data packets handling circuitry, wherein the apparatus controller is arranged to use said at least one state transition table for implementing at least one finite state machine, wherein the apparatus controller is arranged to use said at least one state transition table for handling separately distinct incoming data packets flows through corresponding distinct instances of finite state machine, wherein said at least one state transition table corresponds to the combination of a state table, a condition table and a flow table, wherein the apparatus controller is arranged to store the state table, the condition table and the flow table, wherein the apparatus controller comprises a condition logic for calculating one or more or all conditions stored in the condition table based on data from the state table in order to query the flow table;
wherein the apparatus controller is arranged to apply a second key extraction function to data in incoming data packets for the purpose of updating the state table, the update information comprises information for updating the state column in the state table, and the update information comprises information for updating at least one of the flow variable columns in the state table.

13. Apparatus according to claim 12, wherein the state table comprises a key column, a state column and a first plurality of flow variable columns, and the apparatus controller is arranged to determine through the state table state data and flow data based on data in incoming data packets, wherein the condition table comprises a first operand column, a second operand column and an operation column, and a second plurality of condition rows, each row of the condition rows corresponding to a condition being a conditional operator to be applied to a first operand and a second operand, wherein the flow table comprises a state column, an event column, an action column, an update column and a third plurality of condition check columns, and the apparatus controller is arranged to determine through the flow table action information and update information based on information on events occurring at the input/output ports, on state data determined through the state table and on condition data determined through the condition table, the action information relating to forwarding actions to be performed on incoming data packets, the update information relating to row updates to be performed on data in the state table, and wherein the condition logic is connected to outputs of the state table and to inputs of the flow table, as well as to the condition table, and is arranged to calculate conditions stored in the condition table based on data from the state table, and to provide condition data in order to query the flow table.

14. Apparatus according to claim 12, wherein said at least one state transition table corresponds to the combination of a state table, a global variable table, a condition table and a flow table, wherein the apparatus controller is arranged to store the state table, the global variable table, the condition table and the flow table, wherein the condition logic is connected also to outputs of the global variable table, and is arranged to calculate conditions stored in the condition table based also on data from the global variable table.

15. Apparatus according to claim 12, wherein the apparatus has a control port for communication between the internal apparatus controller and an external network controller, wherein the apparatus controller is arranged to receive the state table, the global variable table, the condition table and the flow table through the control port.

16. Apparatus according to claim 12, wherein the apparatus controller is arranged to apply a first key extraction function to data in incoming data packets for the purpose of querying the state table.

17. Apparatus according to claim 12, wherein the update information comprises information for updating the global variable table.

18. Apparatus according to claim 12, comprising further an arithmetic logic system, wherein the update information (UI) comprises one or more instructions to be executed by the arithmetic logic system for updating a flow variable in the state table and/or a global variable global in the variable table.

19. Apparatus according to claim 12, wherein said flow table consists of a content-addressable memory, in particular a ternary content-addressable memory.

* * * * *